United States Patent
Ito et al.

(10) Patent No.: US 9,582,742 B2
(45) Date of Patent: Feb. 28, 2017

(54) PRINTING DEVICE FOR GENERATING DISPLAY SIGNALS

(71) Applicant: SEIKO EPSON CORPORATION, Tokyo (JP)

(72) Inventors: Akemi Ito, Nagano (JP); Hiromichi Yamagishi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 236 days.

(21) Appl. No.: 14/541,491

(22) Filed: Nov. 14, 2014

(65) Prior Publication Data

US 2015/0207947 A1 Jul. 23, 2015

(30) Foreign Application Priority Data

Jan. 22, 2014 (JP) ................................. 2014-009250

(51) Int. Cl.
| | |
|---|---|
| G06K 15/00 | (2006.01) |
| G06F 3/12 | (2006.01) |
| G06K 15/16 | (2006.01) |
| G03G 15/00 | (2006.01) |
| H04N 1/00 | (2006.01) |

(52) U.S. Cl.
CPC ....... G06K 15/005 (2013.01); G03G 15/6502 (2013.01); G06F 3/121 (2013.01); G06K 15/16 (2013.01); H04N 1/0062 (2013.01); H04N 1/00477 (2013.01); H04N 1/00663 (2013.01)

(58) Field of Classification Search
None
See application file for complete search history.

(56) References Cited

U.S. PATENT DOCUMENTS

| | | | | |
|---|---|---|---|---|
| 4,561,772 A | * | 12/1985 | Smith | G03B 27/6257 271/3.14 |
| 6,421,135 B1 | * | 7/2002 | Fresk et al. | 358/1.15 |
| 6,962,449 B2 | * | 11/2005 | Lermant | B41J 11/485 358/1.13 |
| 2001/0044868 A1 | * | 11/2001 | Roztocil | G06F 17/212 358/1.1 |
| 2004/0136736 A1 | * | 7/2004 | Inaba | 399/38 |
| 2006/0012807 A1 | * | 1/2006 | Bos et al. | 358/1.8 |
| 2006/0017958 A1 | * | 1/2006 | Jackson et al. | 358/1.14 |
| 2006/0033262 A1 | * | 2/2006 | Stemmle | B65H 9/04 271/258.01 |

(Continued)

FOREIGN PATENT DOCUMENTS

JP    2002-278377 A    9/2002

*Primary Examiner* — Ming Hon
(74) *Attorney, Agent, or Firm* — Global IP Counselors, LLP

(57) ABSTRACT

A printing device for implementing printing on a medium includes a detection unit and a control unit. The detection unit is configured to detect loading of the medium into the printing device and withdrawal of the medium from the printing device. The control unit is configured to indicate contents displayed on a display screen. The control unit is further configured to generate a first signal of displaying a first screen on the display screen when the detection unit detects that the medium has been withdrawn from the printing device, and generate a second signal of displaying a second screen different from the first screen on the display screen when the detection unit detects that the medium has been loaded into the printing device.

11 Claims, 5 Drawing Sheets

(56) References Cited

U.S. PATENT DOCUMENTS

| | | | |
|---|---|---|---|
| 2007/0002349 A1* | 1/2007 | Hwang et al. | 358/1.13 |
| 2007/0071477 A1* | 3/2007 | Tanaka | G03G 15/6508 399/82 |
| 2007/0109575 A1* | 5/2007 | Salgado et al. | 358/1.13 |
| 2007/0263255 A1* | 11/2007 | Johnson et al. | 358/2.1 |
| 2008/0239381 A1* | 10/2008 | Oshima | G06F 3/1204 358/1.15 |
| 2009/0166949 A1* | 7/2009 | Unno | 271/9.03 |
| 2010/0149564 A1* | 6/2010 | Yasunaga et al. | 358/1.9 |
| 2011/0043860 A1* | 2/2011 | Hitose et al. | 358/1.18 |
| 2011/0149311 A1* | 6/2011 | Mestha | H04N 1/6033 358/1.9 |
| 2012/0070214 A1* | 3/2012 | Okutsu | 399/388 |

\* cited by examiner

PRINTING DEVICE FOR GENERATING DISPLAY SIGNALS

CROSS-REFERENCE TO RELATED APPLICATIONS

This application claims priority to Japanese Patent Application No. 2014-009250 filed on Jan. 22, 2014. The entire disclosure of Japanese Patent Application No. 2014-009250 is hereby incorporated herein by reference.

BACKGROUND

Technical Field

The present invention relates to a printing device.

Related Art

As a printing device, for example as noted in Unexamined Patent Publication No. 2002-278377, known are printing devices equipped with a feed tray in which media such as paper or the like is housed. With this kind of printing device, when a designated condition such as the feed tray being pulled out from the printing device or the feed tray being pushed into the printing device is established, information relating to attributes such as the size, type or the like of the media that is housed or that was housed in that feed tray is made to be displayed on a display screen.

However, when contents according to the state of the printing device are displayed on the display screen, displaying suitable information according to the any given occasion leads to improved usability.

SUMMARY

An object of the present invention is to provide a printing device which can improve usability when a user is operating the printing device based on information displayed on a display screen.

Noted below are the means for solving the problems noted above and the effects.

The printing device for solving the problems noted above is a printing device for implementing printing on a medium, equipped with a detection unit configured to detect loading of the medium into the printing device and withdrawal of the medium from the printing device, and a control unit configured to indicate contents displayed on a display screen. Also, the control unit is configured to generate a first signal of displaying a first screen on the display screen when the detection unit detects that the medium has been withdrawn from the printing device, and generate a second signal of displaying a second screen different from the first screen on the display screen when the detection unit detects that the medium has been loaded into the printing device.

With the constitution noted above, the contents displayed on the display screen when the medium is withdrawn from the printing device and the contents displayed on the display screen when the medium is loaded into the printing device are different. Because of that, with the display screen, when the user withdraws the medium from the printing device, and when the user loads the medium into the printing device, it is possible to provide the user with suitable information according to each state. Therefore, it is possible to improve usability when the user is operating the printing device based on information displayed on the display screen.

With the printing device noted above, it is preferable to have it such that the first screen is a screen that provides a method of loading the medium into the printing device, and the second screen is a screen in which attributes are set for the media loaded into the printing device. Here, "attributes" means at least one of the media size or media type.

With the constitution noted above, as the first screen, by displaying on the display screen a screen that provides a method of loading the medium into the printing device, it is possible to improve the usability for the user who is newly attempting to load the medium into the printing device. Also, when the user loads the medium into the printing device, by displaying on the display screen as the second screen a screen for setting the attributes of the medium, it is possible to keep the user from forgetting to set the medium.

Also, with the printing device noted above, it is preferable to have it such that the first screen is a screen that provides, of all types of media that the printing device is configured to print, a method of loading a portion of the media according to a user operation. With this constitution, compared to a screen that provides a method of loading medium common to all types of media, it is easier to provided information the user wishes to know.

Also, with the printing device noted above, it is preferable to have it such that the second screen includes a screen for which visibility of the attributes of the portion of the media is made to be higher than visibility of attributes of the other media. With this constitution, it is possible to increase the usability when setting media attributes while viewing the display contents of the display screen.

Also, with the printing device noted above, it is preferable to have it such that the user operation includes an operation of a user when requesting the printing to the printing device. In this case, it is preferable to have it such that the portion of the media includes a medium for which the request for the printing to the printing device is specified.

Information such as the media size and the like is included in the printing request to the printing device (also called a "print job"). Because of that, with the constitution noted above, it is possible to display on the display screen information relating to the medium specified with the printing request, so it is possible to increase usability.

Also, with the printing device noted above, it is preferable to have it such that the user operation includes an operation of withdrawing the medium from the printing device. In this case, it is preferable to have it such that the portion of the media includes a medium for which the detection unit detects that the medium has been withdrawn from the printing device.

When loading medium into the printing device after the medium has been withdrawn from the printing device, it is possible to load medium of the same attributes as the medium that had been loaded into the printing device up to that time. In light of that, with the constitution noted above, it is possible to display on the display screen information relating to the medium for which it is detected that it has been withdrawn from the printing device, so it is possible to increase the usability.

Also, with the printing device noted above, it is also possible to be equipped with a plurality of media housing units in which the media are housed. In this case, it is preferable to have it such that the user operation includes operations by the user on the media housing units, and the portion of the media is one or a plurality of types of media that, of the media housing units, is housed in one of the media housing units in which the medium has been taken out or the medium has been loaded.

With the printing device equipped with a plurality of media housing units, it is easy to specify the type of media to load for each media housing unit. In light of that, with the constitution noted above, it is possible to display on the display screen information related to medium according to the media housing unit for which it was detected medium was taken out or medium was loaded, so it is possible to increase usability.

Also, with the printing device noted above, it is also possible to be equipped with a media housing unit in which the medium is housed, and to have it such that the detection unit is configured to detect pulling out of the media housing unit from the printing device and pushing in of the media housing unit into the printing device. In this case, it is preferable to have it such that the control unit is configured to generate the first signal when the detection unit detects that the media housing unit has been pulled out from the printing device, and generate the second signal when the detection unit detects that the media housing unit has been pushed into the printing device.

With the constitution noted above, it is possible to display the first screen on the display screen when the media housing unit is pulled out. Also, it is possible to display the second screen on the display screen when the media housing unit is pushed in.

The printing device for solving the problems noted above is a printing device comprising a cassette in which a medium is housed, which is configured to implement printing on the medium conveyed from that cassette, equipped with a detection unit configured to detect loading of the cassette into the printing device and withdrawal of the cassette from the printing device, and a control unit configured to indicate contents displayed on a display screen. The control unit is configured to generate a first signal of displaying a first screen on the display screen when the detection unit detects that the cassette has been withdrawn from the printing device, and generate a second signal of displaying a second screen different from the first screen on the display screen when the detection unit detects that the cassette has been loaded into the printing device. Also, when the detection unit detects that the cassette has been withdrawn from the printing device other than when the medium within that cassette has run out midway in the printing process based on a print job, the control unit is configured to generate a signal of displaying as the first screen a screen that provides a method of loading into the printing device all types of media that the printing device is configured to print, or a portion of the media corresponding to the cassette, and generate a signal of displaying as the second screen a screen for setting attributes of the medium loaded into the printing device. Also, when the detection unit detects that the cassette has been withdrawn from the printing device when the medium within that cassette has run out midway in the printing process based on a print job, the control unit is configured to generate a signal of displaying as the first screen a screen that provides a method of loading into the printing device the medium that ran out midway and not to generate a signal of displaying the second screen, or generate a signal of displaying as the second screen a screen by which a user confirms the attributes of the medium that ran out midway.

BRIEF DESCRIPTION OF THE DRAWINGS

Referring now to the attached drawings which form a part of this original disclosure:

FIGS. 3A through 3D are drawings showing an example of the screen displayed on the display unit when the tray is pushed in;

FIG. 6 is a block diagram showing an overview of the control device that the printing device of another embodiment is equipped with.

DETAILED DESCRIPTION OF EXEMPLARY EMBODIMENTS

Following, we will describe an embodiment of the printing device following FIG. 1 through FIG. 5.

Figure 1:
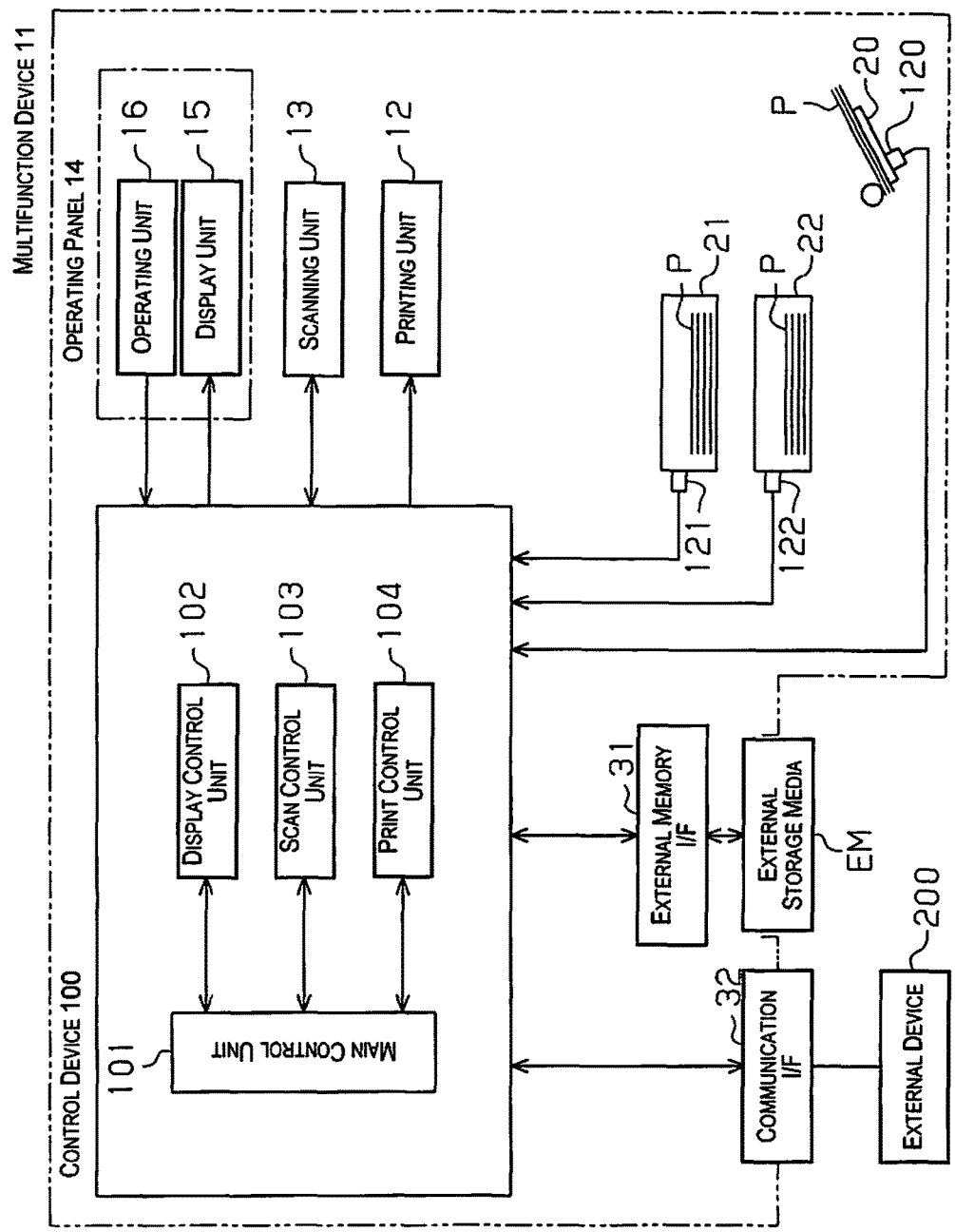
FIG. 1 is a block diagram showing an overview of a multifunction device which is an embodiment of a printing device.

FIG. 1 illustrates a multifunction device 11 which is an example of a printing device. As shown in FIG. 1, the multifunction device 11 is equipped with a printing unit 12 which implements printing on paper P which is an example of media, a scanning unit 13 which reads an image recorded on a document placed on a setting base, an operating panel 14 which is a user interface, and a control device 100 which controls the multifunction device 11.

The printing unit 12 has a conveyance mechanism for conveying the paper P up to a designated printing area, and exhausting already printed paper P, and a printing mechanism for adhering a recording material such as ink or the like on the paper P conveyed up to the printing area. As a method for printing by the printing mechanism, for example, it is possible to use the inkjet method or the laser method.

The operating panel 14 has a display unit 15 for displaying information of the multifunction device 11 or the like, and an operating unit 16 consisting of various types of operating buttons or the like. In regards to this point, with this embodiment, an example of the "display screen" is constituted by the display unit 15.

Also, provided with the multifunction device 11 are a feed tray for manual insertion in which the paper P can be placed (hereafter also called a "manually inserted tray") 20, and a plurality of feed trays in which the paper P can be housed (hereafter also called "cassette trays") 21 and 22. These cassette trays 21 and 22 are detachable with the multifunction device 11. An example of the "media housing unit" and the "cassette" are constituted by the cassette trays 21 and 22.

Also, provided on the multifunction device 11 are tray sensors 121 and 122 that detect when the cassette trays 21 and 22 are pushed into the multifunction device 11 (specifically, when the cassette trays 21 and 22 are loaded into the multifunction device 11), and whether in a state for which it is possible for the paper P to be conveyed from those cassette trays 21 and 22, and a paper sensor 120 that detects whether or not the paper P is loaded in a state for which it can be conveyed on the manually inserted tray 20. As long as the tray sensors 121 and 122 are able to detect a housed state for which the cassette trays 21 and 22 have been pushed into the multifunction device 11, and a withdrawn state for which the cassette trays 21 and 22 are pulled out from the multifunction device 11, they can be optical type sensors, or can be mechanical type sensors. Also, as long as the paper sensor 120 is able to detect whether or not the paper P is in a state that can be conveyed from the manually inserted tray 20 to the printing area, it can be an optical type sensor, or can be a mechanical type sensor.

In light of that, the information detected by each of these types of sensors 120 to 122 is input to the control device 100.

Specifically, with this embodiment, an example of the "detection unit" for detecting loading of the paper P to the multifunction device 11 and withdrawing of the paper P from that same multifunction device 11 is constituted by the tray sensors 121 and 122 and the paper sensor 120. What is called "loading of the paper P to the multifunction device 11" here means being in a state for which it is possible to convey paper by the conveyance mechanism of the printing unit 12 by an operation by the user. Also, "withdrawing of the paper P from the multifunction device 11" means the paper has run out from the position for which it is possible to be conveyed by the conveyance mechanism by an operation by the user.

The multifunction device 11 is also equipped with an external memory interface (hereafter also called "external memory I/F") 31 and a communication interface (hereafter also called "communication I/F") 32. The external memory I/F 31 makes possible access by the control device 100 to an external storage medium EM such as a memory card or the like inserted in a slot. The communication I/F 32 connects the multifunction device 11 with an external device 200, and makes it possible to transmit each type of instruction such as printing instructions or the like from the external device 200 to the control device 100. As the external device 200, examples include a personal computer, a smart phone, and a mobile information terminal such as a tablet terminal or the like.

The control device 100 is equipped with a CPU, nonvolatile memory, RAM, and ASIC (Application Specific IC) and the like. In the nonvolatile memory, programs necessary for various types of control for the multifunction device 11 are stored, and the various types of control of the multifunction device 11 are performed by the CPU executing the programs.

Next, we will describe the functional constitution of the control device 100.

As shown in FIG. 1, as the functional unit realized by at least one of software and hardware, the main control unit 101 has a display control unit 102, a scan control unit 103, and a print control unit 104. The main control unit 101 comprehensively controls (manages) the display control unit 102, the scan control unit 103, and the print control unit 104 according to a request based on information detected by each type of sensor 120 to 122 and the like, and operation by the user of the external device 200 and the operating panel 14. The display control unit 102 controls the display contents of the display unit 15 of the operating panel 14, the scan control unit 103 controls the scanning unit 13, and the print control unit 104 controls the printing unit 12.

Specifically, when it receives a print job which is a printing request based on an operation by the user of the operating panel 14 or the external device 200, the main control unit 101 outputs that same print job to the print control unit 104. Then, the print control unit 104 controls the printing unit 12 so as to implement printing on the paper P of the attributes specified by the print job. The "attributes of the paper P" include the paper size and type.

Also, when there is a copy request for the document placed on the aforementioned setting base, the main control unit 101 outputs a document scan request to the scan control unit 103. Having done that, the scan control unit 103 controls the scanning unit 13 so as to read the image of the document placed on the aforementioned setting base. Then, when reading of the image is completed, the scan control unit 103 outputs a message to that effect to the main control unit 101. Subsequently, the main control unit 101 outputs to the print control unit 104 a print job for printing on the paper P the image that was read by the scanning unit 13. Having done that, the print control unit 104 controls the printing unit 12 so as to print on the paper P the image read by the scanning unit 13.

Also, when there has been detection of pulling out of the cassette trays 21 and 22 (or withdrawal from the multifunction device 11) by the tray sensors 121 and 122, or detection of withdrawal of the paper P from the manually inserted tray 20 by the paper sensor 120, the main control unit 101 generates a first instruction signal in order to display a first screen on the display unit 15, and outputs that same first instruction signal to the display control unit 102. Having done that, the display control unit 102 displays a first image on the display unit 15 based on the first instruction signal. The first instruction signal is an example of the "first signal."

Also, when there has been detection of pushing in of the cassette trays 21 and 22 (or mounting to the multifunction device 11) by the tray sensors 121 and 122, or detection of placing (loading) of the paper P in the manually inserted tray 20 by the paper sensor 120, the main control unit 101 generates a second instruction signal in order to display a second image on the display unit 15, and outputs that same second instruction signal to the display control unit 102. Having done that, the display control unit 102 displays a second screen on the display unit 15 based on the second instruction signal. Therefore, with this embodiment, an example of the "control unit" that indicates the contents displayed on the display unit (display screen) 15 is constituted by the main control unit 101. The second instruction signal is an example of the "second signal."

Figure 2:
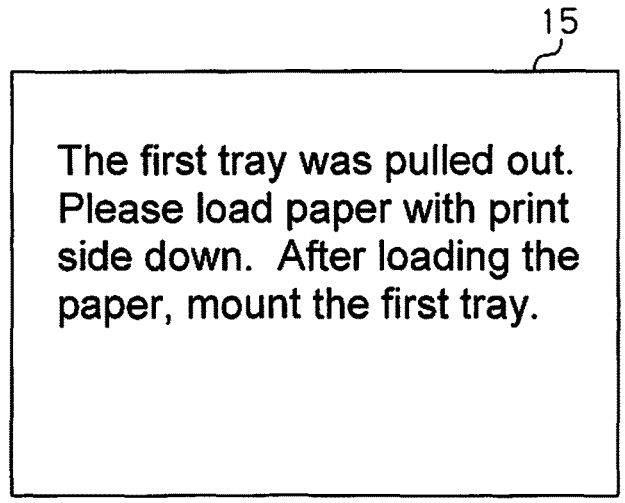
FIG. 2 is a drawing showing an example of the screen displayed on the display unit when the tray is pulled out.

FIG. 2 illustrates as an example of the first screen the first screen displayed on the display unit 15 when the first cassette tray 21 is pulled out. With the display unit 15, the first cassette tray 21 is displayed as the "first tray," and the second cassette tray 22 is displayed as the "second tray." As shown in FIG. 2, the first screen is a screen that provides the user with a method for loading paper into the cassette tray that has been pulled out. With the first screen, it is possible to provide not just the orientation for loading the paper, but also a guide moving method for performing position adjustment according to the size of the paper being loaded.

The second screen is a screen with different contents from the first screen, and is a screen for the user to confirm and set the attributes of the paper P loaded into the tray. At this time, the contents of the second screen are transitioned as appropriate according to operation by the user of the operating unit 16 or the external device 200.

Figure 3A:
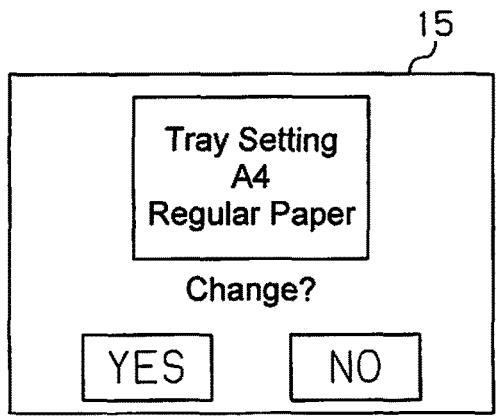

FIG. 3A is an example of the second screen immediately after detection by the tray sensors 121 and 122 of pushing in of the cassette trays 21 and 22, or detection by the paper sensor 120 of placement of the paper P in the manually inserted tray 20. For example, as shown in FIG. 3A, with this second screen at the start, it displays whether or not to change the settings of "A4" as the paper size and "regular paper" as the paper type for the tray settings which are set for the tray in which paper is newly set (e.g. first cassette tray 21). In this state, if "No" is selected by the user operation, the tray settings are set with "A4" as the paper size and "regular paper" as the paper type. Specifically, with the multifunction device 11, it is confirmed that "A4" regular paper is loaded in the first cassette tray 21. Here, attributes such as "A4," "regular paper" and the like are attributes set previously or default attributes or the like as described later.

Figure 3C:
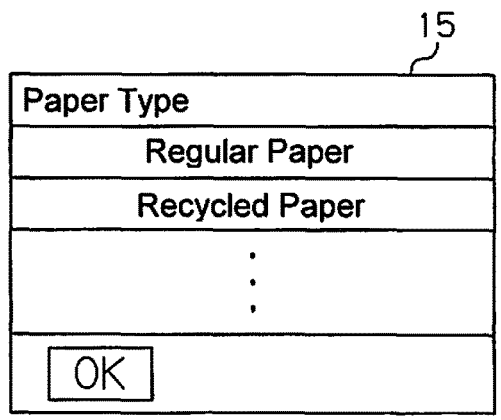
Figure 3B:
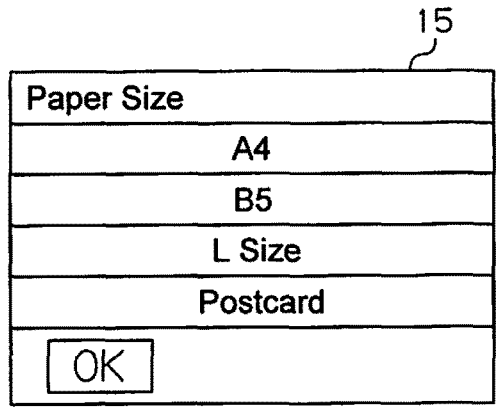

On the other hand, when "Yes" is selected by the user operation, the second screen transitions from FIG. 3A to FIG. 3B. FIG. 3B is an example of the "screen for setting the paper size." With the second screen shown in this FIG. 3B, the paper sizes that can be selected are aligned and displayed, and when the paper size (e.g. "B5") is selected and "OK" is operated by the user operation, the second screen transitions from FIG. 3B to FIG. 3C.

Figure 3D:
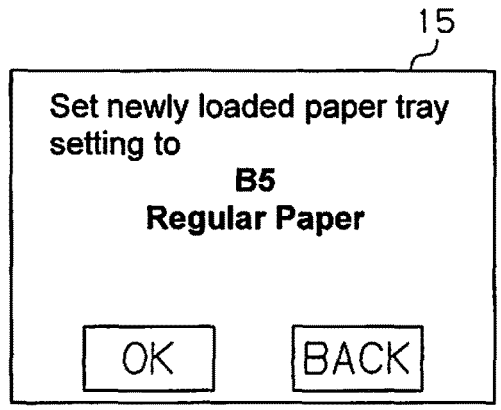

FIG. 3C is an example of the "screen for setting the paper type." With the second screen shown in this FIG. 3C, the types of paper that can be selected are aligned and displayed, and when the paper type (e.g. "regular paper") is selected and "OK" is operated by the user operation, the second screen transitions from FIG. 3C to FIG. 3D.

FIG. 3D shows a screen for confirming the paper attributes selected by user operation. Then, when the second screen shown in FIG. 3D is displayed, when "OK" is selected by the user operation, the display of the second screen with the display unit 15 ends. Specifically, the tray settings are set. On the other hand, when "Back" is selected when the second screen shown in FIG. 3D is displayed, the second screen returns from FIG. 3D to FIG. 3C. It is also possible to display "Back" on the screens shown in FIG. 3B and FIG. 3C.

Figure 4:
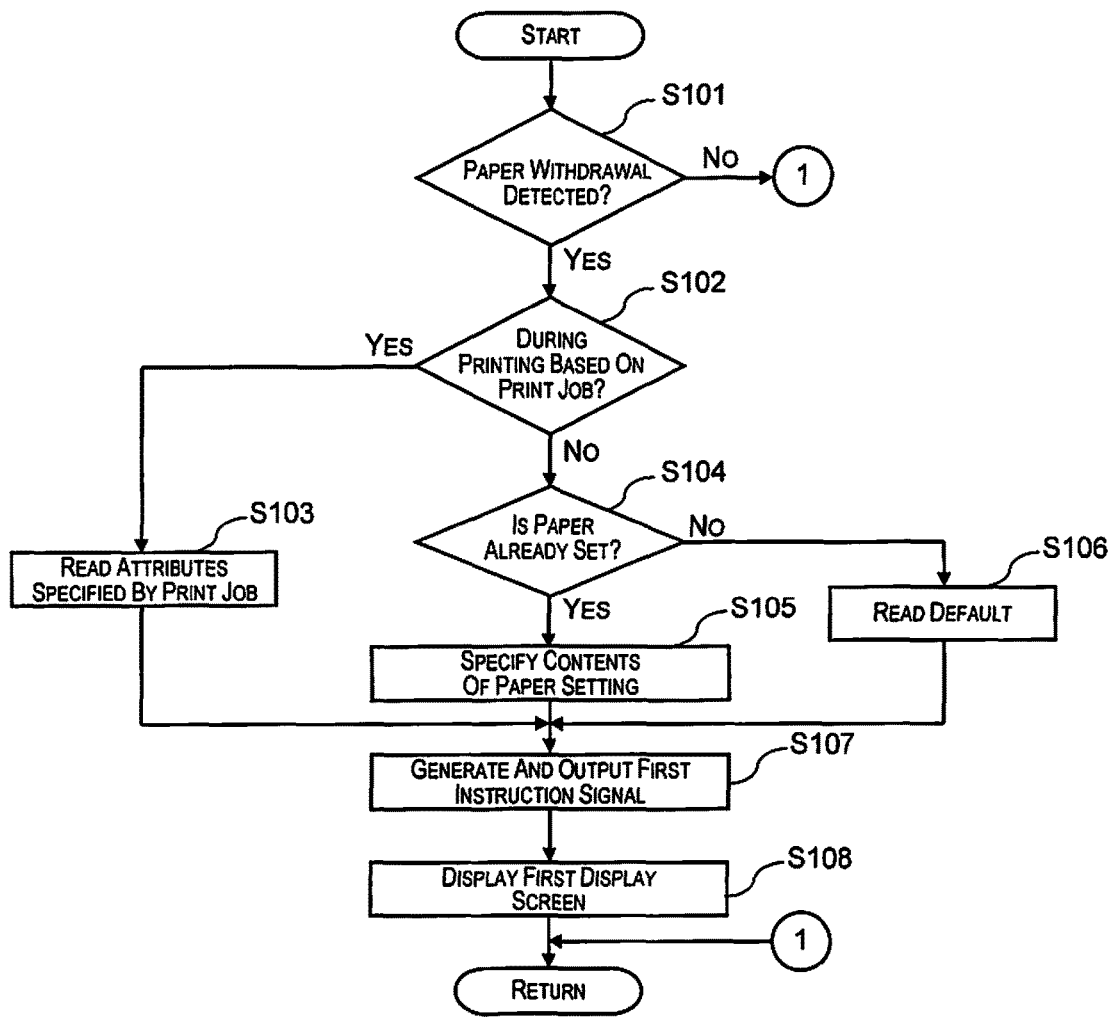
FIG. 4 is a flow chart showing the processing routine executed to display the first screen on the display unit.

Next, while referring to the flow chart shown in FIG. 4, we will describe the processing routine executed by the control device 100 for displaying the first screen on the display unit 15. This processing routine is executed for each preset control cycle.

As shown in FIG. 4, the main control unit 101 determines whether or not withdrawal of the paper P from the multifunction device 11 has been detected (step S101). For example, when it is detected by the paper sensor 120 that all the paper P has been withdrawn from the manually inserted tray 20, the main control unit 101 determines that the paper P has been withdrawn from the multifunction device 11. Also, when it is detected by the tray sensors 121 and 122 that the cassette trays 21 and 22 have been pulled out, the main control unit 101 determines that the paper P has been withdrawn from the multifunction device 11.

When it is not detected that the paper P has been withdrawn from the multifunction device 11 (step S101: No), the main control unit 101 ends the main processing routine temporarily. On the other hand, when it is detected that the paper P has been withdrawn from the multifunction device 11 (step S101: Yes), the main control unit 101 determines whether or not this was midway during execution of printing based on the print job (specifically, during the printing process) (step S102). When withdrawal of the paper P from the multifunction device 11 is detected during execution of printing (e.g. when pulling out of the second cassette tray 22 from the multifunction device 11 is detected), it is possible that the paper has run out. In this case, there is a high probability of paper of the same attributes as the paper housed in the second cassette tray 22 when printing started to be filled in that same second cassette tray 22. Because of that, when it is midway during execution of printing (step S102: Yes), with the paper P specified with the print job as "a portion of the media," the main control unit 101 reads the same paper P attributes (size and type) (step S103). After that, the main control unit 101 moves the process to step S107 described later.

On the other hand, when printing is not being executed (step S102: No), the main control unit 101 determines whether or not the paper settings have already been done by a user operation (step S104). After the paper of the attributes (e.g. "A4" regular paper) one wishes to load into the tray (e.g. first cassette tray 21), specifically, the paper of the attributes one wishes to print, has been set by the user, there are cases when the first cassette tray 21 is pulled out from the multifunction device 11 by that same user. In this case, it is preferable that the first screen relating to the paper of the attributes the user wishes to load in that tray be displayed on the display unit 15. Because of that, when the paper settings have already been done (step S104: Yes), with the set paper P as "one portion of the media," the main control unit 101 specifies the attributes of that same paper P (step S105). After that, the main control unit 101 moves the process to step S107 described later.

On the other hand, when the paper settings have not been done (step S104: No), the main control unit 101 reads the default preset paper settings (step S106). After that, the main control unit 101 moves the process to the next step S107.

At step S107, the main control unit 101 generates a first instruction signal and outputs it to the display control unit 102. For example, when the printing is executed based on the print job, specifically, when the process of step S103 is executed, the main control unit 101 generates the first instruction signal for displaying information relating to the paper attributes specified with that same print job. Also, when the paper settings have already been done, specifically, when the process of step S105 has been done, the main control unit 101 generates the first instruction signal to display information relating to the paper attributes shown by those settings. Also, when paper settings have not been done, specifically, when the processing of step S106 has been executed, the main control unit 101 generates the first instruction signal to display default information.

Subsequently, the display control unit 102 in which the first instruction signal has been input displays on the display unit 15 the first screen based on that same first instruction signal (step S108). In this case, when the first instruction signal indicates to display information relating to the attributes, the display control unit 102 displays on the display unit 15 a screen providing a method for loading the paper of those attributes into the multifunction device 11. On the other hand, when the first instruction signal does not indicate display of information relating to the attributes, specifically, when it indicates display of default information, the display control unit 102 displays on the display unit 15 a screen that provides a method of loading all the paper that can be used with the multifunction device 11. After that, the main control unit 101 temporarily ends the main processing routine.

Figure 5:
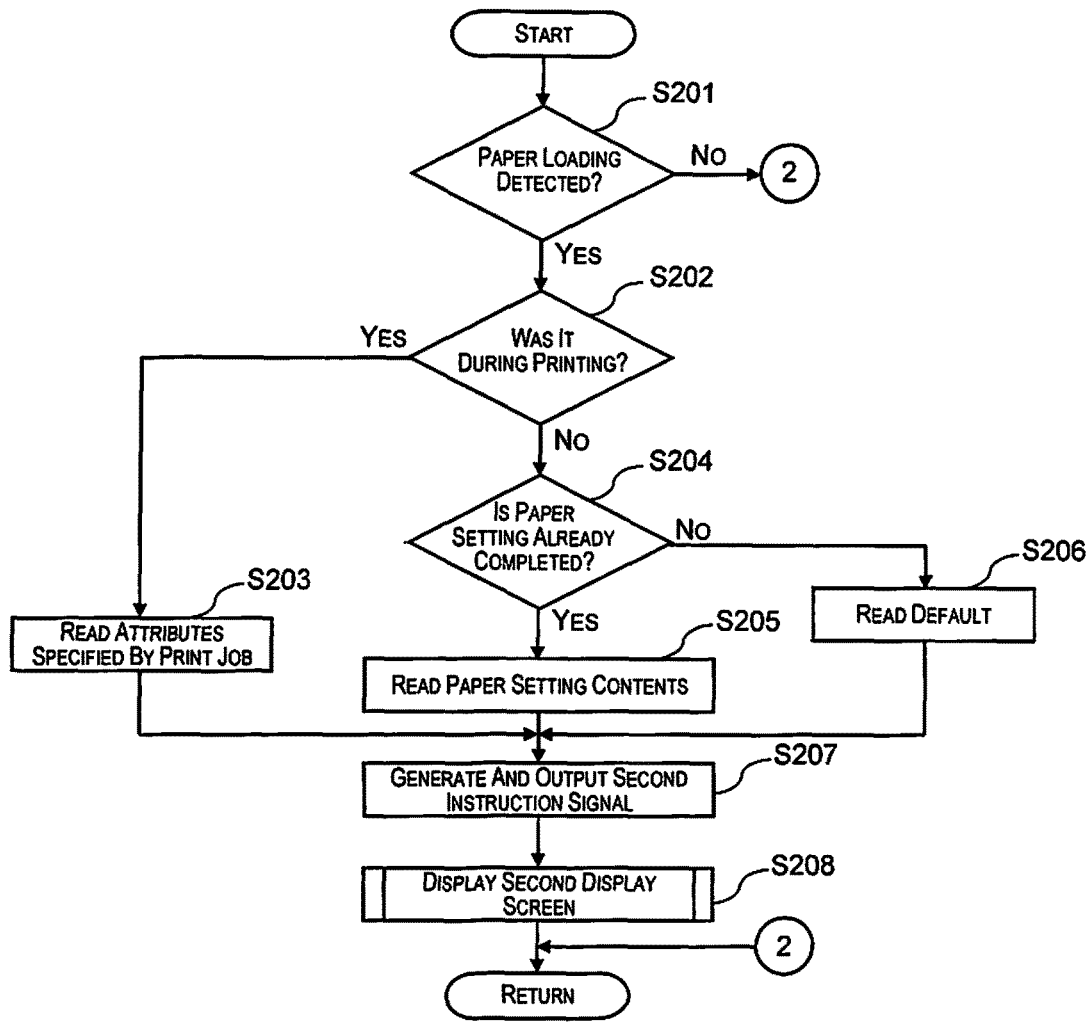
FIG. 5 is a flow chart showing the processing routine executed to display the second screen on the display unit.

Next, referring to the flow chart shown in FIG. 5, we will describe the processing routine executed by the control device 100 to display the second screen on the display unit 15. This processing routine is executed for each preset control cycle.

As shown in FIG. 5, the main control unit 101 determines whether or not loading of the paper P into the multifunction device 11 has been detected (step S201). For example, when the paper sensor 120 has detected loading of the paper P into the manually inserted tray 20, the main control unit 101 determines that the paper P is loaded in the multifunction device 11. Also, when the tray sensors 121 and 122 detect that the cassette trays 21 and 22 have been pushed in, the main control unit 101 determines that the paper P has been loaded into the multifunction device 11. There are cases when the same type of paper sensor as the paper sensor 120 is provided in the cassette trays 21 and 22. In this case, it is also possible to have it so that when the tray sensors 121 and 122 detect that the cassette trays 21 and 22 have been pushed in, and the paper sensor detects that paper has been loaded in those cassette trays 21 and 22, the main control unit 101 determines that the paper P has been loaded in the multifunction device 11. Also, the main control unit 101 can also determine that the paper P has been loaded by the detection results of the cassette trays 21 and 22 being pushed in.

When loading of the paper P into the multifunction device 11 is not detected (step S201: No), the main control unit 101 temporarily ends the main processing routine. On the other hand, when it is detected that the paper P has been loaded into the multifunction device 11 (step S201: Yes), the main control unit 101 determines whether or not this was midway in printing (printing process) based on the print job (step S202). When it is midway in printing (step S202: Yes), the main control unit 101 reads the paper attributes specified with the print job (step S203), and moves the process to step S207 described later.

On the other hand, when not midway during printing (step S202: No), the main control unit 101 determines whether or not the paper settings have already been completed (step S204). When the paper settings have already been completed (step S204: Yes), the main control unit 101 reads the contents of those paper settings (paper attributes) (step S205), and moves the process to step S207 described later. On the other hand, when the paper settings have not been done yet (step S204: No), the main control unit 101 reads the paper attributes set by default (step S206), and moves the process to the next step S207.

At step S207, the main control unit 101 generates a second instruction signal to display information relating to the read paper attributes and outputs that to the display control unit 102. For example, when midway in printing based on the print job, specifically, when the process of step S203 has been executed, the main control unit 101 generates a second instruction signal to display information relating to the paper attributes specified with that same print job. Also, when the paper settings have already been done, specifically, when the process of step S205 has been executed, the main control unit 101 generates the second instruction signal to display information relating to the paper attributes set with those paper settings. Also, when the paper setting have not been done, specifically, whet the process of step S206 has been executed, the main control unit 101 generates the second instruction signal to display information relating to the default paper attributes.

Subsequently, the display control unit 102 in which the second instruction signal has been input displays on the display unit 15 the second screen based on that same second instruction signal (step S208). In this case, the display control unit 102 displays the screen for having the user confirm whether or not to change the tray settings from the attributes indicated by that information based on information relating to the attributes shown with the second instruction signal (see FIG. 3A). Then, the display control unit 102 transitions the contents of the screen as appropriate by a user operation in a state with this kind of second screen displayed on the display unit 15. Then, when the tray settings are completed, the display control unit 102 outputs a message to that effect to the main control unit 101. Having done that, the main control unit 101 temporarily ends the main processing routine.

Next, we will describe the effect when paper has run out midway in printing based on a print job. The tray for which paper has run out will be the first cassette tray 21.

When the paper P within the first cassette tray 21 runs out midway during printing, when the first cassette tray 21 is pulled out from the multifunction device 11 by the user, the first screen which provides a method for loading paper into the first cassette tray 21 is displayed on the display unit 15 of the operating panel 14 (see FIG. 2). At this time, as the first screen, displayed on the display unit 15 is a screen that provides a method of loading the paper of the attributes specified with the print job (e.g. L-size (size), photographic paper (type)) into the first cassette tray 21.

Then, when the paper P is loaded into the first cassette tray 21 and the first cassette tray 21 is pushed into the multifunction device 11, when it is detected that paper P has been loaded into the multifunction device 11, displayed on the display unit 15 is the second screen for setting the tray setting of the first cassette tray 21 (see FIGS. 3A-3D). In this case, first, a screen is displayed for confirming whether or not to change the tray settings from the paper attributes specified with the print job (see FIG. 3A). Then, after that, the second screen is transitioned as appropriate by the user operation. However, when the paper P has run out midway in one print job that specified paper of the same attributes, normally, a change of paper attributes is not required. Because of that, on the display unit 15, instead of the screen with which the paper attributes specified with the print job can be changed, it is also possible to display a screen for confirming those paper attributes without an operating button or the like relating to changes.

Next, we will describe the operation when changing the paper loaded into the manually inserted tray 20 after paper settings have been performed.

For example, we will assume a case in which, when "A4" regular paper has been set for the manually inserted tray 20, the user changes to "L-size" photographic paper. In this case, when the user withdraws the paper P ("A4" regular paper) from the manually inserted tray 20, displayed on the display unit 15 is the first screen that provides a method of loading paper into the manually inserted tray 20. At this time, as the first screen, displayed on the display unit 15 is the screen that provides a method for loading "L-size" photographic paper into the manually inserted tray 20.

Then, when the paper P is loaded into the manually inserted tray 20, displayed on the display unit 15 is the second screen for setting the tray setting of the manually inserted tray 20. In this case, at first, displayed is a screen for confirming whether or not to change from the paper attributes (size is L-size, type is photographic paper) according to the already set paper settings. Then, after that, the second screen is transitioned as appropriate by user operation. When doing a transition as appropriate, to make the operation by the user easy, a button such as OK or the like indicating confirmation for the attributes displayed on the display unit 15 can also be displayed as the second screen. By doing this, it is possible to guide the user to the next screen simply by the user selecting OK in sequence.

Next, we will describe the operation when loading paper in the tray when in a state that is not midway in printing, and when paper settings have not been done.

For example, when the second cassette tray 22 is pulled out from the multifunction device 11, displayed on the display unit 15 is the first screen that provides a method of loading the paper into the second cassette tray 22. At this time, on the display unit 15 is displayed a screen that provides a method for loading the paper corresponding to all the paper that can be used with the multifunction device 11.

Then, when paper (e.g. "B5" regular paper) is housed in the second cassette tray 22, and the second cassette tray 22 is pushed into the multifunction device 11, it is detected that paper P has been loaded into the multifunction device 11, and displayed on the display unit 15 is the second screen for setting the tray setting of the second cassette tray 22 (see FIG. 3). In this case, first, displayed is a screen for confirming whether or not to change the tray setting from the paper attributes set as the default (e.g. "A4" regular paper) (see FIG. 3A). Then, after that, the second screen is transitioned as appropriate by user operation.

As described above, with the constitutions and operations noted above, it is possible to obtain the kinds of effects noted hereafter.

(1) The contents displayed on the display unit 15 when the paper P is withdrawn from the multifunction device 11 are different from the contents displayed on the display unit 15 when the paper P is loaded into the multifunction device 11. Because of that, with the display unit 15, when the user withdraws the paper P from the multifunction device 11, and when the user loads the paper P into the multifunction device 11, it is possible to provide the user with suitable information according to various states. Therefore, it is possible to improve the usability when the user is operating the multifunction device 11 based on the information displayed on the display unit 15.

(2) When the user withdraws the paper P from the multifunction device 11 midway during printing, with the display unit 15, provided is a method for loading into the tray the paper P of the attributes specified with the print job. Specifically, it is possible to provide to the user information relating to the paper of the attributes for which there is a high probability of the user wishing to load into the multifunction device 11. Because of that, compared to when providing a method of loading into the tray all the types of paper P that can be used with the multifunction device 11, it is easier for that user to visually recognize the information it is thought the user wishes to know. Therefore, it is possible to increase the usability when loading the paper P into the multifunction device 11.

Also, when it is detected that the paper P has been loaded into the multifunction device 11, the screen for performing tray setting (second screen) is displayed. At this time, whether or not it is acceptable to set the tray settings with the paper attributes specified with the print job is displayed on the display unit 15. Because of that, even at a time when loading the paper P midway in printing in this way, compared to when displaying on the display unit 15 whether or not it is acceptable to set the tray settings with the paper attributes set by default, it is possible to shorten the time required for tray setting when continuing printing based on the print job.

(3) Also, when it is detected that the paper P has been withdrawn from the multifunction device 11 after paper settings are performed, with the display unit 15, a method is provided for loading the paper P of the set attributes in the tray. Specifically, it is possible to provide to the user information relating to the paper of the attributes thought to have a high possibility of the user wanting to load in the multifunction device 11. Because of that, compared to when providing a method of loading in the tray all the types of paper P that can be used with the multifunction device 11, it is easier for that user to visually recognize information it is thought that the user wishes to know. Therefore, it is possible to improve the usability when loading the paper P to the multifunction device.

Also, when it is detected that the paper P has been loaded in the multifunction device 11, a screen for performing tray setting (second screen) is displayed. At this time, whether or not it is acceptable to use the already set paper settings as is displayed on the display unit 15. Because of that, even when during loading of the paper P midway during printing in this way, it is possible to shorten the time required for tray setting compared to a case when displaying on the display unit 15 whether or not it is acceptable to set the tray settings with the paper attributes set as the default.

It is also possible to change the embodiments noted above as follows.

When loading the paper into the multifunction device 11 after the paper has been withdrawn from the multifunction device 11, it is possible that paper of the same attributes as the paper loaded in the multifunction device 11 up to then will be loaded again. In particular, when the cassette tray is pulled out, and after that that same cassette tray is pushed into the multifunction device 11, there is a high possibility of paper of the same attributes as the paper loaded in that same tray before the tray was pulled out being loaded again. In light of that, the paper loaded in the same tray before detection of the tray being pulled out is the "portion of the media," and the same paper attributes are "the previous attributes." In this case, immediately after loading of the paper into the multifunction device 11 is detected, it is possible to display on the display unit 15 whether or not it is acceptable to have the tray setting be the aforementioned previous attributes. It is possible to increase usability in this kind of case as well.

Also, in this case, to have the tray setting be different from the aforementioned previous attributes, when the second screen is transitioned to the paper size setting screen (see FIG. 3B), it is also possible change as appropriate the alignment sequence of the candidate paper sizes. For example, when midway during printing, the paper size specified by the print job can be displayed at a position easy for the user to visually recognize (e.g. highest position on the screen). Also, when paper settings have already been done before the paper is withdrawn from the multifunction device 11, it is also possible to display the paper size based on the paper settings at a position easy for the user to visually recognize (e.g. highest position on the screen).

When a print job is input, there are cases when paper of the attributes specified with that print job is not loaded in any of the trays. When the tray is pulled out under such a circumstance, as the first screen, it is also possible to display on the display unit 15 a screen that provides a method of loading all the paper that can be used with the multifunction device 11, or all the paper that can be loaded in that tray. In this case, when it is detected that the tray has been pushed in after that, as the second screen, it is also possible to display on the display unit 15 a screen for confirming whether or not it is acceptable to use the attributes specified with the print job as the tray setting.

The print job received from the external device 200 includes information specifying the paper attributes subject to printing. However, there are cases when the paper of the attributes specified with the print job is not loaded in the multifunction device 11. In this case, there are cases when replacement of the paper loaded in the tray is performed by the user. In this case, when it is detected that paper has been withdrawn from the tray or that the cassette tray has been pulled out, as the first screen, it is also possible to display a screen that provides a method of loading paper of the attributes specified with the print job.

Then, as the second screen immediately after detection that paper has been loaded in the multifunction device 11, it is also possible to display on the display unit 15 a screen that has the user confirm whether or not to change from the paper attributes specified with the print job. With this constitution, it is possible for the user who loaded the paper of the attributes specified with the print job in the multifunction device 11 to suppress to a minimum the effort when performing tray setting.

Figure 6:
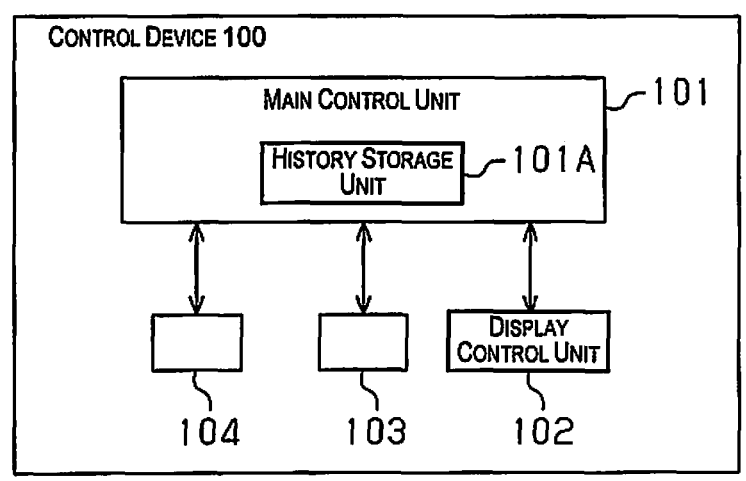

Even with a multifunction device 11 equipped with a plurality of the same type of cassette tray, there are cases when the attributes of the housed paper are set to some degree for each cassette tray. In light of that, as shown in FIG. 6, it is also possible to provide a history storage unit 101A that stores the usage history of the paper used with the multifunction device 11 in the main control unit 101 of the control device 100. In this history storage unit 101A, it is also possible to store the history of the loaded paper for each tray. In this case, for example when the first cassette tray 21 that has for example "A4" regular paper loaded most often is pulled out, it is possible to have this "A4" regular paper be a "portion of the media." In this case, displayed on the display unit 15 as the first screen is a screen that provides a method for setting "A4" regular paper in the first cassette tray 21. Also, when the first cassette tray 21 is pushed in, as the second screen, displayed is a screen for whether or not a tray setting is acceptable with the size as "A4" and the type as regular paper. It is possible to increase usability in this case as well.

When the paper runs out midway during printing and the cassette trays 21 and 22 are pulled out from the multifunction device 11, and the cassette trays 21 and 22 refilled with paper are pushed into the multifunction device 11, it is also possible to not display the second screen that is the screen for confirming the paper settings. In this case, it is acceptable to not generate the second instruction signal.

The multifunction device 11 can also be equipped with a plurality of cassette trays with mutually different paper sizes that can be housed (there can be one or a plurality mutually different paper sizes). Alternatively, while overlapping a portion of the paper sizes that can be housed, it is also possible to be equipped with a cassette tray with a narrow paper size range and a cassette tray with a wide range. In this case, it is preferable to provide default paper attributes for each cassette tray. In any of the cases noted above, it is possible to use as the first screen a screen that provides a method of loading paper within the range that can be loaded in the pulled out tray.

With the multifunction device 11, there are cases when it is detected that a plurality of cassette trays have been pulled out. In this case, it is possible to have displayed on the display unit 15 as the first screen a screen that provides a method of loading paper in the range that can be loaded in the plurality of pulled out trays, and possible to have displayed on the display unit 15 as the first screen a screen that provides a method of loading all the paper that can be used with the multifunction device 11.

The first display screen, even midway during printing, can be a screen that provides a method of loading all the paper that can be used with the multifunction device 11 even when the paper settings have already been done before detection of withdrawal of the paper from the multifunction device 11.

When the paper has been withdrawn from the multifunction device 11, it is possible to display the first screen also on the display of the external device which is able to communicate with the multifunction device 11. In this case, the first instruction signal generated by the main control unit 101 is received at the external device 200, and the computer of the external device 200 displays on the display a first image based on the first instruction signal. Specifically, of each step S101 through S108 shown in FIG. 4, the process of step S101 up to S107 is executed by the control device 100 of the multifunction device 11, and the process of step S108 is executed by the external device 200.

Also, when paper is loaded in the multifunction device 11, it is possible to display a second image on the display of the external device 200 as well. In this case, the second instruction signal generated by the main control unit 101 is received at the external device 200, and a second image is displayed by the computer on the display based on the second instruction signal. Specifically, of the steps S201 to S208 shown in FIG. 5, the process of step S201 up to S207 is executed by the control device 100 of the multifunction device 11, and the process of step S208 is executed by the external device 200.

The first instruction signal can also be a signal that includes image data for which the first screen displayed on the display unit 15 is image captured. Similarly, the second instruction signal can also be a signal that includes image data for which the second screen displayed on the display unit 15 is image captured.

Rather than a screen that provides a method for loading paper, the first screen can also be a screen that provides information related to the tray pulled out from the multifunction device 11. For example, as the tray related information, examples include the type of paper that can be loaded into that tray, or the type of paper that was loaded in that tray in the past. Also, when a plurality of trays that can be pulled out from the multifunction device 11 are provided, it is also possible to display on the display unit 15 as the first screen a screen that tells which of the trays was pulled out.

The multifunction device 11 can also be a constitution equipped with any number of cassette trays other than 2 (e.g. 1 or 3).

The multifunction device 11 can also be a device not equipped with the manually inserted tray 20.

As long as it has a function as a printer, the printing device can also be a device that is not equipped with a scanning unit.

As long as it can be loaded into a tray, the media can also be a media other than paper (e.g. film).

Next, we will give the additional descriptions below of the technical concept that can be understood from the embodiment noted above and the other embodiments.

(A) It is also possible to be equipped with a history storage unit for storing the usage history of the types of media used with the printing device, and when withdrawal of media from the printing device is detected by the detection unit, to have the control unit set a portion of the media based on the usage history stored in the history storage unit.

With the constitution noted above, by being based on the usage history of the printing device by the user, when the user withdraws the media from the printing device, and when the user loads the media into the printing device, it is possible to provide the user with suitable information according to each type of state. Therefore, it is possible to improve usability when the user operates the printing device based on information displayed on the display screen.

(B) A display method for changing the contents of the display screen in cooperation with the status of the printing device, having a step of displaying a first screen on the display screen when it is detected that media loaded in the printing device for printing an image on media has been withdrawn, and a step of displaying on the display screen a second screen different from the first screen when it is detected that media is loaded in the printing device.

(C) A display program for executing actions on an external device that can communicate with the printing device for printing an image on media and that has a display screen, wherein executed on the external device are a step of displaying a first screen on the display screen when media loaded in the printing device is withdrawn, and a first instruction signal sent from that same printing device is received, and a step of displaying a second screen different from the first screen on the display screen when media is loaded in the printing device and a second instruction signal sent from that same printing device is received.

(D) A printing device equipped with a cassette in which media is housed, for implementing printing on the media conveyed from that cassette, equipped with a detection unit for detecting loading of the cassette into the printing device and withdrawal of the cassette from that printing device, and a control unit for indicating the contents to be displayed on the display screen, wherein the control unit generates a first signal for displaying a first screen on the display screen when it is detected by the detection unit that the cassette is withdrawn from the printing device, and generates a second signal for displaying a second screen different from the first screen on the display screen when it is detected by the detection unit that the cassette is loaded into the printing device, and in a case other than when the media inside the cassette has run out midway in the printing process based on the print job (e.g. rather than midway in printing, when paper is loaded in the tray in a state without paper settings done, or the like), when the detection unit detects that the cassette has been withdrawn from the printing device, the control unit generates a signal for displaying as the first screen a screen that provides a method for loading all types of media that can be printed by the printing device, or a portion of the media corresponding to the cassette into the printing device (the media in a range that can be loaded in the tray), and generates a signal for displaying as the second screen a screen for setting the attributes of the media loaded in the printing device, and when it is detected by the detection unit that the cassette has been withdrawn from the printing device in a case when the media in the cassette has run out midway in the printing process based on the print job, the control unit generates a signal for displaying as the first screen a screen that provides a method of loading the media that ran out midway into the printing device, and either does not generate a signal for displaying the second screen, or generates a signal for displaying as the second screen a screen that has the user confirm the attributes of the media which ran out midway (a screen for confirming those paper attributes without operating buttons for changing or the like).

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing device comprising:
a printing unit configured to print on a medium based on a print job that specifies an attribute of the medium;
a detection unit configured to detect loading of the medium into the printing device and withdrawal of the medium from the printing device; and
a control unit configured to generate a first signal of a first screen on a display screen in response to determining that the detection unit detects that the medium is withdrawn from the printing device, and generate a second signal of a second screen different from the first screen on the display screen in response to the detection unit detecting that the medium is loaded into the printing device,
in response to determining that the detection unit detects that the medium is withdrawn from the printing device, the control unit generating a signal of the first screen that provides a method of loading a plurality of types of media and generating a signal of the second screen for setting an attribute of the medium loaded into the printing device, and
in response to determining that the detection unit detects that the medium is withdrawn from the printing device when the medium corresponding to the print job is run out in the middle of printing, the control unit generating, by using the attribute specified by the print job, a signal of the first screen that provides a method of loading the medium corresponding to the print job.

2. The printing device according to claim 1, wherein the second screen is a screen in which an attribute is set for the medium loaded into the printing device.

3. The printing device according to claim 1, wherein the first screen is a screen that provides, of all types of media that the printing device is configured to print, a method of loading a portion of the media according to a user operation.

4. The printing device according to claim 3, wherein the second screen includes a screen for which visibility of attributes of the portion of the media is made to be higher than visibility of attributes of the other media.

5. The printing device according to claim 3, wherein the user operation includes an operation of a user when requesting the printing to the printing device, and the portion of the media includes a medium for which the request for the printing to the printing device is specified.

6. The printing device according to claim 3, wherein the user operation includes an operation of withdrawing the medium from the printing device, and the portion of the media includes a medium for which the detection unit detects that the medium has been withdrawn from the printing device.

7. The printing device according to claim 3, further comprising a plurality of media housing units in which the media are housed, wherein
the user operation includes an operation of a user on the media housing units, and
the portion of the media is one or a plurality of types of media that, of the media housing units, is housed in one of the media housing units in which the medium has been taken out or the medium has been loaded.

8. The printing device according to claim 1, further comprising a media housing unit in which the medium is housed, wherein
the detection unit is further configured to detect pulling out of the media housing unit from the printing device and pushing in of the media housing unit into the printing device, and
the control unit is further configured to generate the first signal when the detection unit detects that the media housing unit has been pulled out from the printing device, and generate the second signal when the detection unit detects that the media housing unit has been pushed into the printing device.

9. The printing device according to claim 1, wherein
the control unit is configured to generate the second signal of the second screen that is for setting an attribute for the medium loaded in the printing device and in which a plurality of candidate attributes of the medium are indicated and an alignment sequence of the candidate attributes is changeable.

10. A printing device comprising:
a cassette in which a medium is housed,
a printing unit configured to print on the medium conveyed from the cassette based on a print job that specifies an attribute of the medium;
a detection unit configured to detect loading of the cassette into the printing device and withdrawal of the cassette from the printing device; and
a control unit configured to generate a first signal of a first screen on a display screen in response to the detection unit detecting that the cassette is withdrawn from the printing device, and generate a second signal of a second screen different from the first screen on the display screen in response to the detection unit detecting that the cassette is loaded into the printing device, and
in response to determining that the detection unit detects that the cassette is withdrawn from the printing device, the control unit generating a signal of the first screen that provides a method of loading all the types of media, or a portion of the types of media corresponding to the cassette, and generating a signal of the second screen for setting an attribute of the medium loaded into the printing device, and
in response to determining that the detection unit detects that the cassette is withdrawn from the printing device when the medium corresponding to the print job is run out in the middle of printing, the control unit generating, by using the attribute specified by the print job, a signal of the first screen that provides a method of loading the medium corresponding to the print job into the cassette and not to generate a signal of the second screen, or generate a signal of the second screen by which a user confirms the attribute of the medium.

11. A printing device comprising:
a printing unit configured to print on a medium based on a print job;
a detection unit configured to detect loading of the medium into the printing device and withdrawal of the medium from the printing device;
a storage unit configured to store an attribute of the medium; and
a control unit configured to generate a first signal of a first screen on a display screen in response to determining that the detection unit detects that the medium is withdrawn from the printing device, and generate a second signal of a second screen different from the first screen on the display screen in response to determining that the detecting unit detects that the medium is loaded into the printing device,
in response to determining that the detection unit detects that the medium is withdrawn from the printing device, the control unit generating, by using the attribute stored in the storage unit, a signal of the first screen that provides a method of loading the medium corresponding to the attribute stored in the storage,
the first screen indicating an orientation of a print side of the medium according to the attribute of the medium.

* * * * *